United States Patent Office 3,082,217
Patented Mar. 19, 1963

3,082,217
TESTOLOLACTONE DERIVATIVES
Howard J. Ringold and Fred A. Kincl, Mexico City, Mexico, assignors, by mesne assignments, to Syntex Corporation, a corporation of Panama
No Drawing. Filed June 27, 1960, Ser. No. 38,765
Claims priority, application Mexico July 2, 1959
27 Claims. (Cl. 260—343.2)

The present invention relates to novel cyclopentanophenanthrene compounds and to a process for the production thereof.

More particularly the present invention relates to novel 16β-methyl derivatives of dihydroallotestololactone which may contain double bonds at C–1, 2, C–4, 5 and C–6, 7 as well as a second methyl group at C–2.

The novel compounds of the present invention which inhibit the activity of the pituitary, possess anti-estrogenic acivity and are anabolic agents which have a favorable androgenic-anabolic ratio, are represented by the following formulas:

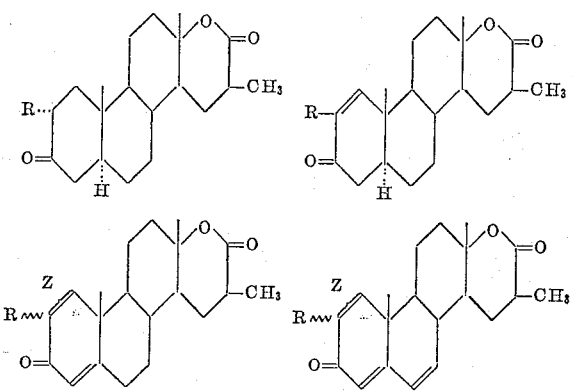

In the above formulas, R represents hydrogen or methyl and Z indicates a double bond or a saturated linkage between C–1 and C–2; when Z is a saturated linkage and R is methyl, the latter is a steric configuration.

The novel compounds of the present invention are prepared by a process illustrated by the following equation:

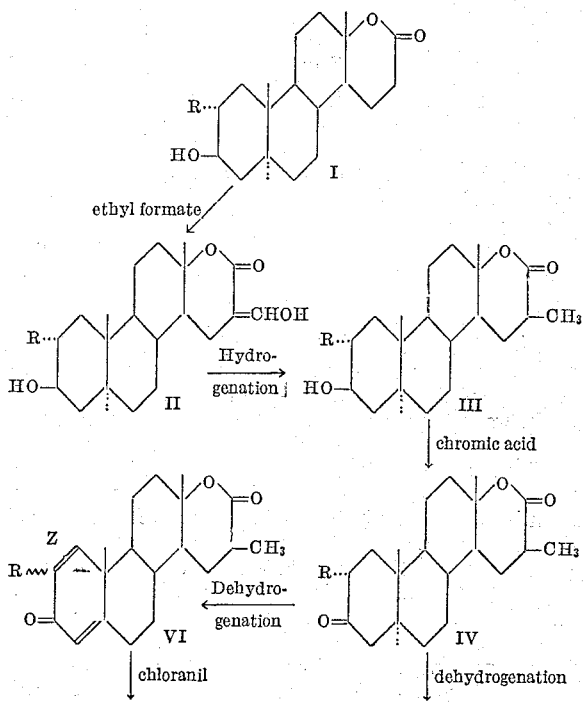

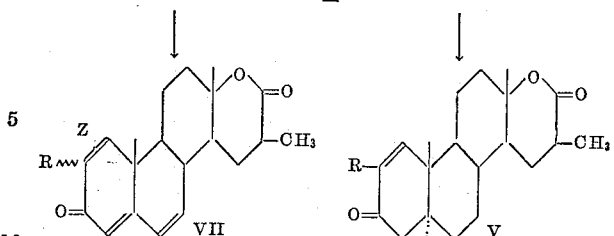

In the above formulas R and Z have the same meaning as previously set forth.

In carrying out the process outlined above, epi-andrololactone or 2α-methyl-epi-andrololactone (I), disclosed in our copending application Serial No. 839,451 filed October 29, 1959, is treated with ethyl formate in benzene solution in the presence of an alkali metal alkoxide such as sodium methoxide at room temperature to produce the sodium salt of 16-hydroxymethylene-epi-andrololactone or the corresponding 2α-methyl derivative, which upon treatment with acid is transformed into the free compound II. The thus formed 16-hydroxymethylene-epi-andrololactone or the 2α-methyl derivative thereof, which per se are pituitary inhibitors and which exhibit anti-estrogenic activity as well as being anabolic agents with a favorable androgenic-anabolic ratio, is then hydrogenated in a solvent such as methanol in the presence of a palladium on charcoal catalyst until 2 molar equivalents of hydrogen are absorbed to form 16β-methyl-epi-andrololactone or 2α,16β-dimethyl-epi-andrololactone (III). By oxidation of the latter compounds in acetone solution with 8N chromic acid prepared with dilute sulfuric acid, there is obtained 16β-methyl-dihydroallotestololactone (IV), or 2α,16β-dimethyl-dihydroallotestololactone (IV).

Alternatively the 16β-methyl-epi-andrololactone (III; R=hydrogen) may be obtained by applying the method of Jacobsen and Levy, J. Biol. Chem. 171, 171, to 16β-methyl-epi-androsterone.

A double bond can then be introduced at C–1, 2 by reacting the 16β-methyl-dihydroallotestololactone or 2α,16β-dimethyl-dihydroallotestololactone with 1 molar equivalent of bromine in acetic acid and in the presence of 1 molar equivalent of sodium acetate, followed by dehydrobromination of the thus formed 2-monobromo compound by heating with calcium carbonate in dimethylacetamide or by refluxing with collidine to form compounds of Formula V, namely 16β-methyl-1-dehydro-dihydroallotestololactone or 2,16β-dimethyl-1-dehydro-dihydroallotestololactone.

By reacting the 16β-methyl-dihydroallotestololactone or 2α,16β-dimethyl-dihydroallotestololactone (IV) with 2 molar equivalents of bromine, preferably in glacial acetic acid and in the absence of sodium acetate, there is formed the 2,4-dibromo compound which upon dehydrobromination, preferably by heating with calcium carbonate in dimethylacetamide, is converted into 16β-methyl-1-dehydro-testololactone or 2,16-dimethyl-1-dehydro-testololactone (VI; Z=double bond). Upon treatment of the 2,4-dibromo compound with an alkali metal iodide, as by refluxing with sodium iodide in acetone, there is formed the 2-iodo - 16β - methyl-testololactone or 2-iodo-2α,16β-dimethyl-testololactone. Upon subsequent reaction with chromous chloride, the iodo moiety is removed to form 16β-methyl-testololactone or 2α,16β-dimethyl-testololactone (V; Z=saturated linkage).

Introduction of an additional double bond at C–6, 7, is effected by refluxing the 16β-methyl-testololactone or the 1-dehydro derivative thereof, as well as the corresponding 2α-methyl compounds, with a quinone having an oxidation-reduction potential of less than −0.5, preferably chloranil, in tertiary butanol or in mixture with ethyl acetate and acetic acid.

The 16β-methyl-1,6-bisdehydro-testololactone or 2,16β-dimethyl-1,6-bisdehydro-testololactone (VII; Z=double bond) is also produced by refluxing 16β-methyl-6-dehydroallotestololactone or 2α,16β-dimethyl-6-dehydro-testololactone (VII; Z=saturated linkage) with selenium dioxide in tertiary butanol and in the presence of catalytic amounts of pyridine. Similarly, upon treatment of 16β-methyl-testololactone or 2α,16β-dimethyl-testololactone (VI; Z=saturated linkage) with selenium dioxide, there is formed 16β-methyl-1-dehydro-testololactone or 2,16β-dimethyl-1-dehydro-testololactone (VI; Z=double bond). Alternatively the dehydrogenation at C-1,2 may be effected by incubation with Corynebacterium simplex ATCC 6946.

In another aspect of the present invention, the novel compounds of the present invention may be prepared by a process illustrated by the following equations:

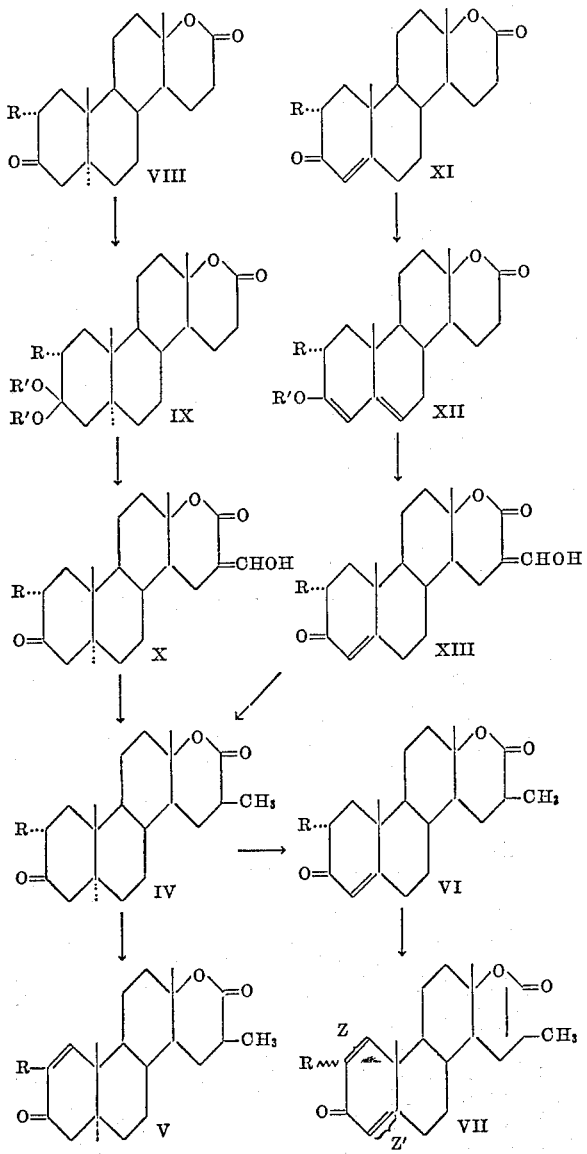

In the above equation R and Z have the same meaning as set forth previously. Z' indicates a double bond or a saturated linkage between C-6 and C-7 and R' represents a lower alkyl group.

In practicing the above process, the 3-keto group of testololactone, dihydroallotestololactone or the 2α-methyl derivatives thereof which are disclosed in our copending application Serial No. 10,544 filed February 24, 1960, is protected prior to introduction of the hydroxymethylene group at C-16. Thus, dihydroallotestololactone or 2α-methyl-dihydroallotestololactone (VIII) is first treated with ethyl orthoformate in a solvent such as dioxane to form the 3,3-diacetal derivative (IX) which upon subsequent reaction with ethyl formate in the presence of sodium ethoxide forms the sodium salt of the 16-hydroxymethylene derivative. Upon acid treatment of the latter there is formed the 16-hydroxymethylene-dihydroallotestololactone or 2α-methyl-16-hydroxymethylene-dihydroallotestololactone (X) which also exhibit the same effects as the 16-hydroxymethylene derivatives of epiandrololactone or of 2α-methyl-epi-andrololactone. The hydroxymethylene group is then hydrogenated as set forth above to form the 16β-methyl-dihydroallotestololactone or 2α,16β-methyl-dihydroallotestololactone (IV) which is then dehydrogenated in the same manner as described previously to form 16β-methyl-1-dehydro-dihydroallotestololactone (V), 2,16β-dimethyl-1-dehydro-dihydroallotestololactone (V), 16β-methyl-testololactone (VI), 2α,16β-dimethyl-testololactone (VI), 16β-methyl-6-dehydro-testololactone (VII), 2α,16β-dimethyl-6-dehydro-testololactone (VII), 16β-methyl-1,6-bis-dehydro-testololactone (VII) or 2,16β-dimethyl-1,6-bis-dehydro-testololactone (VII).

Similarly testololactone or 2α-methyl-testololactone (XI) is first treated with ethyl orthoformate to form the corresponding 3-enol ethers (XII) which, upon treatment with ethyl formate in benzene and in the presence of sodium ethoxide followed by subsequent acid treatment with simultaneous hydrolysis of the enol ether group, is converted into the free 16-hydroxymethylene-testololactone or 2α-methyl-16-hydroxymethylene-testololactone (XIII) which exhibit the same activity as the previously described 16-hydroxymethylene compounds. Upon hydrogenation of the 16-hydroxymethylene-testololactone or 2α-methyl-16-hydroxymethylene-testololactone in the presence of a catalyst such as palladium on charcoal, there is absorbed 3 molar equivalents of hydrogen to produce a mixture of the 5α and 5-normal isomers of 16β-methyl-dihydroallotestololactone and of 2α,16β-dimethyl-dihydrotestololactone which are separated into its components by chromatography.

The biologically active 16-hydroxymethylene intermediates may be esterified with a hydrocarbon carboxylic acid anhydride containing up to 12 carbon atoms by conventional methods to form compounds having an enhanced effect.

The following examples serve to illustrate but are not intended to limit the scope of the invention:

*Example I*

A mixture of 5 g. of epi-andrololactone, 400 cc. of anhydrous benzene, 5 g. of sodium methoxide and 20 cc. of ethyl formate was stirred at room temperature for 4 hours. The precipitate was collected by filtration and added to 200 cc. of ice water containing 20 cc. of concentrated hydrochloric acid, with vigorous stirring. The suspension was stirred for 4 hours at room temperature, at the end of which the precipitate was collected, washed with water and recrystallized from acetone-hexane to give 16-hydroxymethylene-epi-andrololactone.

A solution of 3 g. of the above compound in 900 cc. of methanol was hydrogenated in the presence of 3 g. of 10% palladium on charcoal, at room temperature for 20 hours, at the end of which 2 molar equivalents of hydrogen had been absorbed. The catalyst was removed by filtration, the solution was concentrated to a small volume, treated with 100 cc. of 10% methanolic potassium hydroxide and kept for 1½ hours; the mixture was evaporated to dryness under reduced pressure and the residue was dissolved in water (100 cc.), treated with concentrated hydrochloric acid to strong acid reaction and stirred overnight at room temperature. The precipitate was collected, washed with water, dried and purified by chromatography on silica gel, eluting with benzene-ether. Recrystallization from acetone yielded 16β-methyl-epi-andrololactone; M.P. 145–146° C., [α]$_D$ —53° (chloroform).

A solution of 2 g. of the above compound in 100 cc. of acetone was cooled to 0° C. and treated under an atmosphere of nitrogen while stirring, with a solution of 8N chromic acid until the color of the reagent persisted in the mixture. The oxidizing agent had been prepared by dissolving 26.7 g. of chromium trioxide in 23 cc. of concentrated sulfuric acid and diluting with water to 100 cc.; the mixture was then stirred for 10 minutes more at room temperature, diluted with water and the precipitate was collected, washed with water, dried and recrystallized from ether, thus affording 16β-methyl-dihydroallotestololactone with M.P. 185–187° C.

A solution of 1.8 g. of the above compound in 80 cc. of glacial acetic acid was slowly treated with 40 cc. of glacial acetic acid containing 1.1 molar equivalents of bromine and 1.1 molar equivalents of sodium acetate, with stirring and maintaining the temperature below 20° C. The stirring was continued until almost complete decoloration and the mixture was then poured into ice water, the precipitate was collected, washed with water, dried under vacuum and the product thus obtained (16β-methyl-2-bromo-dihydroallotestololactone) was used for the next step without further purification.

A solution of 1.5 g. of the above compound in 5 cc. of dimethylacetamide was added to a stirred suspension of 0.8 g. of calcium carbonate in 15 cc. of dimethylacetamide previously heated to boiling, and the mixture was refluxed for 15 minutes; after cooling it was poured into 100 cc. of ice water containing 5 cc. of concentrated hydrochloric acid and stirred overnight at room temperature. The precipitate was collected, washed with water, dried and recrystallized from acetone, thus giving 16β-methyl-1-dehydro-dihydroallotestololactone.

*Example II*

By an analogous method to that of Example I, there were prepared another 1.5 g. of 16β-methyl-dihydroallotestololactone which was brominated using 2.2 molar equivalents of bromine instead of 1.1 molar equivalents, and without using sodium acetate. There was thus obtained as an intermediate 2,4-dibromo-dihydroallotestololactone, which was dehydrobrominated with dimethylacetamide in the presence of calcium carbonate and then treated with acid to obtain 16β-methyl-1-dehydro-testololactone.

*Example III*

By an analogous method to that described in the preceding example there was prepared 2 g. of 2,4-dibromo-dihydroallotestololactone which was refluxed with 2.4 g. of sodium iodide in 65 cc. of methylethylketone, for 50 minutes under an atmosphere of nitrogen; the cooled mixture was treated under stirring with sodium thiosulfate and water until complete precipitation of the product which consisted of 16β-methyl-2-iodo-testololactone. It was collected by filtration and used for the next step without further purification.

A solution of chromous chloride was prepared as follows: a mixture of 20 g. of zinc dust, 1.6 g. of mercuric chloride, 20 cc. of water and 1 cc. of concentrated hydrochloric acid was stirred for 5 minutes and the supernatant liquid was decanted; there was then added 40 cc. of water and 4 cc. of concentrated hydrochloric acid and finally 10 g. of chromic chloride in small portions with vigorous stirring and under an atmosphere of carbon dioxide. Thus there was obtained a dark blue solution of chromous chloride.

The above crude 16β-methyl-2-iodo-testololactone was dissolved in 100 cc. of acetone and treated little by little under an atmosphere of carbon dioxide with 40 cc. of the solution of chromous chloride. The mixture was stirred occasionally and after 30 minutes the product was precipitated by the addition of water, collected by filtration, washed with water, dried under vacuum and recrystallized from acetone, thus furnishing 16β-methyl-testololactone.

*Example IV*

A mixture of 1 g. of 16-methyl-testololactone of the preceding example, 2 g. of chloranil, 25 cc. of ethyl acetate and 5 cc. of acetic acid was refluxed for 72 hours under an atmosphere of nitrogen; it was then filtered through celite, washing the filter with ethyl acetate, and the filtrate was evaporated to dryness under reduced pressure. By chromatography of the residue on silica gel there was obtained 16β-methyl-6-dehydro-testololactone.

A mixture of 500 mg. of the above compound, 150 mg. of selenium dioxide, 50 cc. of t-butanol and a few drops of pyridine was refluxed under an atmosphere of nitrogen for 48 hours and filtered while hot through celite, washing the filter with a little hot t-butanol; the filtrate and washings were combined and the solvent was removed by distillation under reduced pressure. The residue was refluxed with 20 cc. of acetone and 500 mg. of decolorizing charcoal for 1 hour, filtered through celite and the filtrate was evaporated to dryness. By subsequent chromatography on silica gel there was obtained 16β-methyl-1,6-bis-dehydro-testololactone.

*Example V*

By an analogous method to that described in the preceding example, 1 g. of 16β-methyl-1-dehydro-testololactone was dehydrogenated by refluxing with chloranil, to produce 16β-methyl-1,6-bis-dehydro-testololactone, identical with the final compound of the preceding example.

*Example VI*

By substituting in the procedure described in Example I the epi-andrololactone by 2α-methyl-epi-andrololactone, there were obtained 2α-methyl-16-hydroxymethylene-epi-andrololactone, 2α,16β-dimethyl-epi-andrololactone, 2α,16β-dimethyl-dihydroallotestololactone, and finally 2,16β-dimethyl-1-dehydro-dihydroallotestololactone.

The latter compound was then converted into 2,16β-dimethyl - 1 - dehydro - testololactone; 2α,16β-dimethyl-testololactone and 2,16β-dimethyl-6-dehydro-testololactone and 2,16β-dimethyl-1,6-bis-dehydro-testololactone by following the procedures described in Examples II, III, and IV respectively.

*Example VII*

A mixture of 5 g. of dihydroallotestololactone, 38 cc. of anhydrous dioxane, 5 cc. of ethyl orthoformate and 175 mg. of p-toluenesulfonic acid was stirred at room temperature and under anhydrous conditions until an homogeneous solution resulted. After further stirring for 45 minutes at room temperature, 4 cc. of pyridine was added and the mixture was poured into water and extracted with methylene chloride; the extract was washed with water to neutral, dried over anhydrous sodium sulfate and the solvent was evaporated. Recrystallization of the residue from aqueous methanol yielded 3,3-diacetal of dihydroallotestosterone.

3 g. of the above diacetate was then subjected to the reaction with ethyl formate in benzene and in the presence of sodium methoxide, and the reaction product was subjected to the acid treatment, following the procedure described in Example I. There was thus obtained 16-hydroxy-methylene-dihydroallotestololactone.

2 g. of the above compound was hydrogenated in methanol and in the presence of palladium on charcoal, also following the method of hydrogenation described in Example I, allowing the absorption of 2 molar equivalents of hydrogen. There was thus obtained 16β-methyl-dihydroallotestololactone, identical with the one described in Example I.

*Example VIII*

There was started from 8 g. of testololactone, which was subjected to the reaction with ethyl orthoformate, followed by the acid treatment, in accordance with the preceding example. There was thus obtained the 3-ethyl enol ether of testololactone.

There was then followed the method of the preceding example, that is, the enol ether was treated with ethyl formate in benzene in the presence of sodium methoxide, in accordance with the procedure of Example I, and the enol ether group was then hydrolyzed with the simultaneous liberation of the free hydroxymethylene group. There was thus obtained 16-hydroxymethylene-testololactone. By an analogous method of hydrogenation to that of Example I, 2 g. of the above compound was then treated in methanol with hydrogen in the presence of palladium on charcoal, until the equivalent of 3 mols of hydrogen were absorbed; there was thus obtained as crude product a mixture of the 5α- and 5-normal isomers of 16β-methyl-dihydrotestololactone, which was separated into its components by chromatography on neutral alumina.

The 16β-methyl-dihydroallotestololactone thus isolated was identical with the 16β-methyl-dihydroallotestololactone described in Example I.

Example IX

By substituting the dihydroallotestololactone of Example VII by 2α-methyl-dihydroallotestololactone and following the procedure of the example, there were produced 2α-methyl-16-hydroxymethylenedihydroallotestololactone and 2α,16β-dimethyl-dihydroallotestololactone identical with the one obtained in Example VI.

Example X

In accordance with the method of Example VIII, 2α-methyltestololactone was converted into 2α-methyl-16-hydroxymethylenetestololactone and finally into 2α,16β-dimethyldihydroallotestololactone and 12α,16β-dimethyl-dihydroallotestololactone, the latter compound being identical with the 2α,16β-dimethyl-dihydroallotestololactone described in Example VI.

Example XI

For esterifying the hydroxylated compounds described in the preceding examples, 1 g. of the steroid in 10 cc. of pyridine was treated with approximately 3-6 molar equivalents of the anhydride of a carboxylic acid containing up to 12 carbon atoms, at room temperature for 4 to 24 hours, and isolating the esterified compounds by conventional methods, such as dilution with water, filtration of the precipitate or isolation by extraction followed by recrystallization and/or chromatography.

Among other esters, there were prepared the diacetates and dipropionates of 16-hydroxymethylene-epi-andrololactone and of 2α-methyl-16-hydroxymethylene-epi-andrololactone, the acetate and propionates of 16-hydroxymethylene-dihydroallotestololactone and 16-hydroxymethylene-testololactone, as well as of the 2α-methyl-analogs of such testololactones.

We claim:
1. A compound of the following formula:

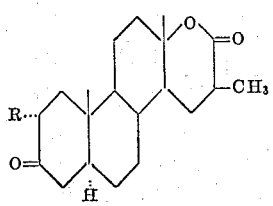

wherein R is selected from the group consisting of hydrogen and methyl.
2. 16β-methyl-dihydroallotestololactone.
3. 2α,16β-dimethyl-dihydroallotestololactone.

4. A compound of the following formula:

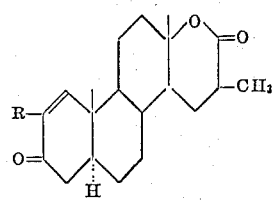

wherein R is selected from the group consisting of hydrogen and methyl.
5. 16β-methyl-1-dehydro-dihydroallotestololactone.
6. 2,16β-methyl-1-dehydro-dihydroallotestololactone.
7. A compound of the following formula:

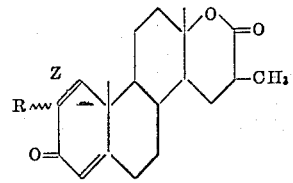

wherein R is selected from the group consisting of hydrogen and methyl and Z is selected from the group consisting of a double bond and a saturated linkage between C–1 and C–2.
8. 16β-methyl-testololactone.
9. 2α,16β-dimethyl-testololactone.
10. 16β-methyl-1-dehydro-testololactone.
11. 2,16β-dimethyl-1-dehydro-testololactone.
12. A compound of the following formula:

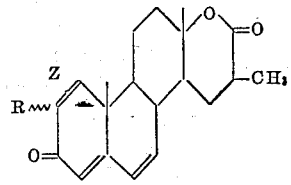

wherein R is selected from the group consisting of hydrogen and methyl and Z is selected from the group consisting of a double bond and a saturated linkage between C–1 and C–2.
13. 16β-methyl-6-dehydro-testololactone.
14. 2α,16β-dimethyl-6-dehydro-testololactone
15. 16β-methyl-1,6-bis-dehydro-testololactone.
16. 2,16β-dimethyl-1,6-bis-dehydro-testololactone.
17. A compound of the following formula:

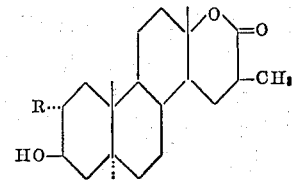

wherein R is selected from the group consisting of hydrogen and methyl.
18. 16β-methyl-epi-andrololactone.
19. 2α,16β-dimethyl-epi-andrololactone.
20. A compound of the following formula:

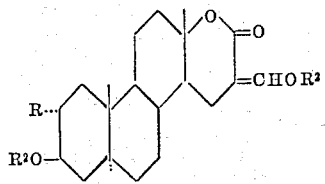

wherein R is selected from the group consisting of hydrogen and methyl; and R² is selected from the group consisting of hydrogen and saturated hydrocarbon carboxylic acyl of up to 12 carbon atoms.
21. The diacetate of 16-hydroxymethylene-epi-andrololactone.

22. The diacetate of 2α-methyl-16-hydroxymethylene-epi-andrololactone.

23. A compound of the following formula:

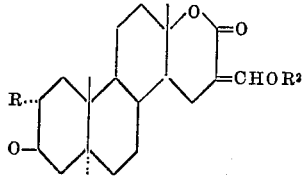

wherein R is selected from the group consisting of hydrogen and methyl; and $R^2$ is selected from the group consisting of hydrogen and saturated hydrocarbon carboxylic acyl of up to 12 carbon atoms.

24. 16β-hydroxymethylene-dihydroallotestololactone.

25. 2α-methyl-16β-acetoxymethylene-dihydroallotestololactone.

26. A compound of the following formula:

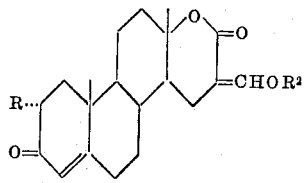

wherein R is selected from the group consisting of hydrogen and methyl; and $R^2$ is selected from the group consisting of hydrogen and saturated hydrocarbon carboxylic acyl of up to 12 carbon atoms.

27. 16β-propionoxymethylene-testololactone.

References Cited in the file of this patent

UNITED STATES PATENTS 2,801,251    Thoma et al.    July 30, 1957

OTHER REFERENCES

Levy et al.: Jour. Biol. Chem., vol. 171 (1947), p. 72.
Fried et al.: Jour. Amer. Chem. Soc., vol. 75 (1953), pp. 5764–5.
Knox et al.: Jour. Org. Chem., volume 26 (1961), pp. 501–504.